United States Patent
Hashimoto et al.

(10) Patent No.: US 11,381,184 B2
(45) Date of Patent: Jul. 5, 2022

(54) DRIVING CIRCUIT FOR STEPPING MOTOR, METHOD OF DRIVING STEPPING MOTOR, AND ELECTRONIC DEVICE USING THE SAME

(71) Applicant: ROHM CO., LTD., Kyoto (JP)

(72) Inventors: Hiroki Hashimoto, Kyoto (JP); Masanori Tsuchihashi, Kyoto (JP); Mitsuo Okada, Kyoto (JP); Ryota Kobayashi, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 24 days.

(21) Appl. No.: 16/788,692

(22) Filed: Feb. 12, 2020

(65) Prior Publication Data

US 2020/0266739 A1 Aug. 20, 2020

(30) Foreign Application Priority Data

Feb. 15, 2019 (JP) .............................. JP2019-025185

(51) Int. Cl.
*H02P 8/12* (2006.01)

(52) U.S. Cl.
CPC ..................... *H02P 8/12* (2013.01)

(58) Field of Classification Search
CPC .... H02P 8/12; H02P 6/182; H02P 8/16; H02P 8/38
See application file for complete search history.

(56) References Cited

U.S. PATENT DOCUMENTS

| 5,625,269 | A | * | 4/1997 | Ikeda | H02P 8/14 318/400.34 |
| 5,977,737 | A | * | 11/1999 | Labriola, II | G05B 11/28 318/560 |
| 8,508,176 | B2 | * | 8/2013 | Birumachi | H02P 8/38 318/685 |
| 9,654,040 | B2 | * | 5/2017 | Tsuchihashi | H02P 8/36 |
| 2007/0252547 | A1 | * | 11/2007 | Kifuku | H02P 23/06 318/432 |
| 2017/0373622 | A1 | * | 12/2017 | Hijikata | H02P 7/29 |
| 2019/0006969 | A1 | * | 1/2019 | Maekawa | H02P 6/18 |

FOREIGN PATENT DOCUMENTS

| JP | H09103096 | A | 4/1997 |
| JP | 2000184789 | A | 6/2000 |
| JP | 2004120957 | A | 4/2004 |
| JP | 2004180354 | A | 6/2004 |
| JP | 6258004 | B | 12/2017 |

* cited by examiner

*Primary Examiner* — Rina I Duda
(74) *Attorney, Agent, or Firm* — Cantor Colburn LLP

(57) ABSTRACT

There is provided a driving circuit for a stepping motor, including: a counter electromotive force detection circuit configured to detect a counter electromotive force generated in a coil; a current value setting circuit configured to generate a current set value based on the counter electromotive force; a constant current chopper circuit configured to generate a pulse-modulated signal which is pulse-modulated so that a detected value of a coil current flowing through the coil approaches a target amount based on the current set value; and a logic circuit configured to control a bridge circuit connected to the coil according to the pulse-modulated signal, wherein the driving circuit is configured to output the current set value to outside or to access the current set value from the outside.

11 Claims, 11 Drawing Sheets

DRIVING CIRCUIT FOR STEPPING MOTOR, METHOD OF DRIVING STEPPING MOTOR, AND ELECTRONIC DEVICE USING THE SAME

CROSS-REFERENCE TO RELATED APPLICATION

The present invention claims priority under 35 U.S.C. § 119 to Japanese Patent Application No. 2019-025185, filed on Feb. 15, 2019, the entire contents of which are incorporated herein by reference.

TECHNICAL FIELD

The present disclosure relates to a driving technique for a stepping motor.

BACKGROUND

A stepping motor has been widely used in electronic devices, industrial machines, and robots. The stepping motor is a synchronous motor which rotates in synchronization with an input clock generated by a host controller, and has excellent controllability for starting, stopping, and positioning. Further, the stepping motor has characteristics that the position control in an open loop is possible and it is suitable for digital signal processing.

In a normal state, a rotor of the stepping motor rotates in synchronization with each step angle proportional to the number of input clocks. However, when sudden load variation or speed variation occurs, the synchronization is lost. This is referred to as step-out. Once step-out occurs, since special processing is then required for normally driving the stepping motor, it is desired to prevent the step-out.

In order to solve such a problem, in many cases, a margin is provided for the assumed maximum load, and a driving circuit is designed so as to obtain output torque in consideration of the step-out margin. However, when the margin is increased, power loss is also increased.

In a related art, a technique for reducing power consumption and improving efficiency has been proposed by optimizing output torque (i.e., current amount) by feedback while preventing step-out. FIG. 1 is a block diagram of a motor system including a conventional stepping motor and a driving circuit therefor.

A host controller 2 supplies an input clock CLK to a driving circuit 4. The driving circuit 4 changes an excitation position in synchronization with the input clock CLK.

FIG. 2 is a diagram illustrating the excitation position. The excitation position is recognized as a combination of coil currents (driving currents) $I_{OUT1}$ and $I_{OUT2}$ flowing through two coils L1 and L2 of a stepping motor 6. Eight excitation positions 1 to 8 are illustrated in FIG. 2. In one-phase excitation, a current alternately flows through the first coil L1 and the second coil L2, and transitions between the excitation positions 2, 4, 6, and 8. In two-phase excitation, a current flows through both the first coil L1 and the second coil L2, and transitions between the excitation positions 1, 3, 5, and 7. One-two-phase excitation is a combination of the one-phase excitation and the two-phase excitation to transition between the excitation positions 1 to 8. In microstep driving, the excitation position is further finely controlled.

FIG. 3 is a diagram illustrating a driving sequence of the stepping motor. At the time of starting, a frequency $f_{IN}$ of the input clock CLK increases with time, and the stepping motor is thus accelerated. Then, when the frequency $f_{IN}$ reaches a certain target value, it is kept constant and the stepping motor is rotated at a constant speed. Thereafter, when the stepping motor is stopped, the frequency of the input clock CLK is lowered to decelerate the stepping motor. The control in FIG. 3 is also referred to as trapezoidal wave driving.

In a normal state, the rotor of the stepping motor rotates in synchronization with each step angle proportional to the number of input clocks. However, when sudden load variation or speed variation occurs, the synchronization is lost. This is referred to as step-out. Once step-out occurs, since a special process is then required for normally driving the stepping motor, it is desired to prevent the step-out.

Therefore, during the acceleration and deceleration having a high possibility of step-out, a target value $I_{REF}$ of the driving currents is set to a fixed value $I_{FULL}$ so as to obtain sufficiently large fixed output torque in consideration of the step-out margin (high torque mode).

In situations where a rotational speed is stable and the possibility of step-out is low, the target value $I_{REF}$ of the driving currents is reduced to improve the efficiency (high efficiency mode). In a related art, a technique for reducing power consumption and improving efficiency has been proposed by optimizing output torque (i.e., current amount) by feedback while preventing step-out. Specifically, a load angle φ is estimated based on a counter electromotive force $V_{BEMF}$, and the target value $I_{REF}$ of the driving currents (coil currents) is feedback-controlled so that the load angle φ approaches a target value $\varphi_{REF}$. The counter electromotive force $V_{BEMF}$ is expressed by Eq. (1).

$$V_{BEMF} = K_E \times \omega \times \cos\varphi \qquad \text{Eq. (1)}$$

wherein ω is a rotational speed of the stepping motor, and $K_E$ is a counter electromotive force constant.

In the technique described in the relate art, a feedback loop is formed so that a detected value cow based on the load angle approaches its target value $\cos(\varphi_{REF})$, and the coil currents $I_{OUT1}$ and $I_{OUT2}$ in the high efficiency mode are optimized.

In a motor system using the driving circuit of the related art, the current amount $I_{REF}$ is generated inside the driving circuit 4. Although the amount of the coil currents includes information useful for system design or control, there is no way to know how much torque allows the stepping motor 6 to be currently driven from the outside of the driving circuit.

SUMMARY

Some embodiments of the present disclosure provide a driving circuit capable of outputting information useful for system design or control to outside.

According to one embodiment of the present disclosure, there is provided a driving circuit for a stepping motor, including: a counter electromotive force detection circuit configured to detect a counter electromotive force generated in a coil; a current value setting circuit configured to generate a current set value based on the counter electromotive force; a constant current chopper circuit configured to generate a pulse-modulated signal which is pulse-modulated so that a detected value of a coil current flowing through the coil approaches a target amount based on the current set value; and a logic circuit configured to control a bridge circuit connected to the coil according to the pulse-modulated signal, wherein the driving circuit is configured to output the current set value to outside or to access the current set value from the outside.

The driving circuit may further include an interface circuit configured to output the current set value to the outside as a digital signal.

The driving circuit may further include a D/A converter configured to convert the current set value into an analog signal; and a buffer circuit configured to output the current set value, which has been converted into the analog signal, to the outside.

According to another embodiment of the present disclosure, there is provided a driving circuit for a stepping motor, including: a counter electromotive force detection circuit configured to detect a counter electromotive force generated in a coil; a current value setting circuit configured to generate a current set value based on the counter electromotive force; a constant current chopper circuit configured to generate a pulse-modulated signal which is pulse-modulated so that a detected value of a coil current flowing through the coil approaches a target amount based on the current set value; and a logic circuit configured to control a bridge circuit connected to the coil according to the pulse-modulated signal, wherein the driving circuit is configured to output the detected value of the coil current to outside or to access the detected value of the coil current from the outside.

The detected value of the coil current may be according to a voltage drop of a detection resistor installed at the bridge circuit, and the driving circuit may further include a buffer configured to output the voltage drop of the detection resistor to the outside.

The detection value of the coil current may be according to a voltage drop of a detection resistor installed at the bridge circuit, and the driving circuit may further include an A/D converter configured to convert the voltage drop of the detection resistor into a digital value; and an interface circuit configured to output the digital value to the outside.

The current value setting circuit may include a load angle estimation part configured to estimate a load angle based on the counter electromotive force; and a feedback controller configured to generate the current set value so that the estimated load angle approaches a predetermined target angle.

The constant current chopper circuit may include a comparator configured to compare the detected value of the coil current with a threshold value based on the current set value; an oscillator configured to oscillate at a predetermined frequency; and a flip-flop configured to output the pulse-modulated signal which transitions to an OFF level in response to an output of the comparator and transitions to an ON level in response to an output of the oscillator.

The driving circuit may be integrated as one body on a single semiconductor substrate. "Integrated as one body" may include the case where all of the circuit components are formed on a semiconductor substrate and the case where the main components of the circuit are integrated as one body, and some of a resistor, a capacitor, and the like for adjusting circuit constants may be installed outside the semiconductor substrate. By integrating circuits on one chip, the circuit area can be reduced and the characteristics of the circuit elements can be kept uniform.

Further, any combination of the above-described components, and any replacement of the components and expressions of the present disclosure between methods, apparatuses, systems, and the like are also effective as embodiments of the present disclosure.

BRIEF DESCRIPTION OF DRAWINGS

The accompanying drawings, which are incorporated in and constitute a part of the specification, illustrate embodiments of the present disclosure.

DETAILED DESCRIPTION

Figure 1:
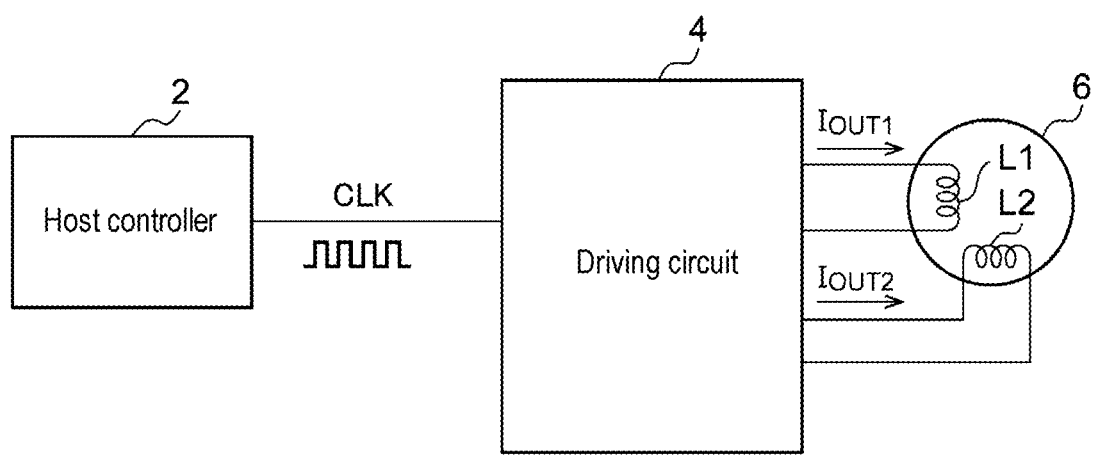
FIG. 1 is a block diagram of a motor system including a conventional stepping motor and a driving circuit therefor.
Figure 2:
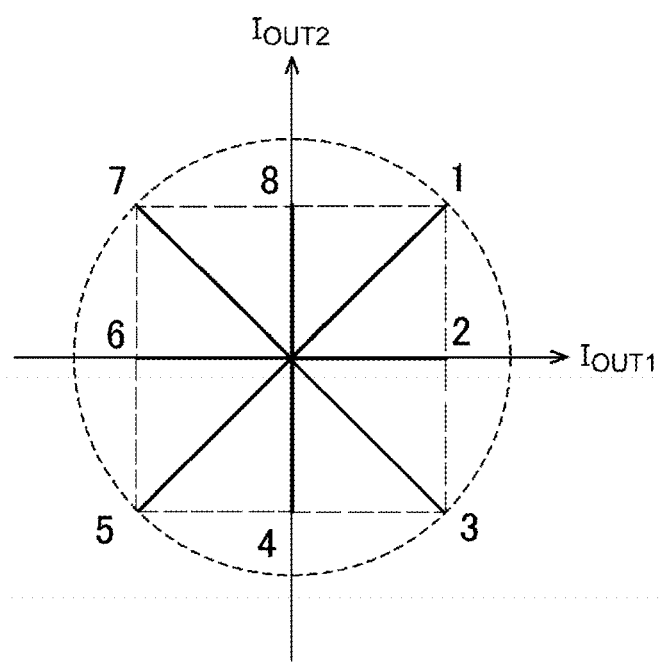
FIG. 2 is a diagram illustrating an excitation position.
Figure 3:
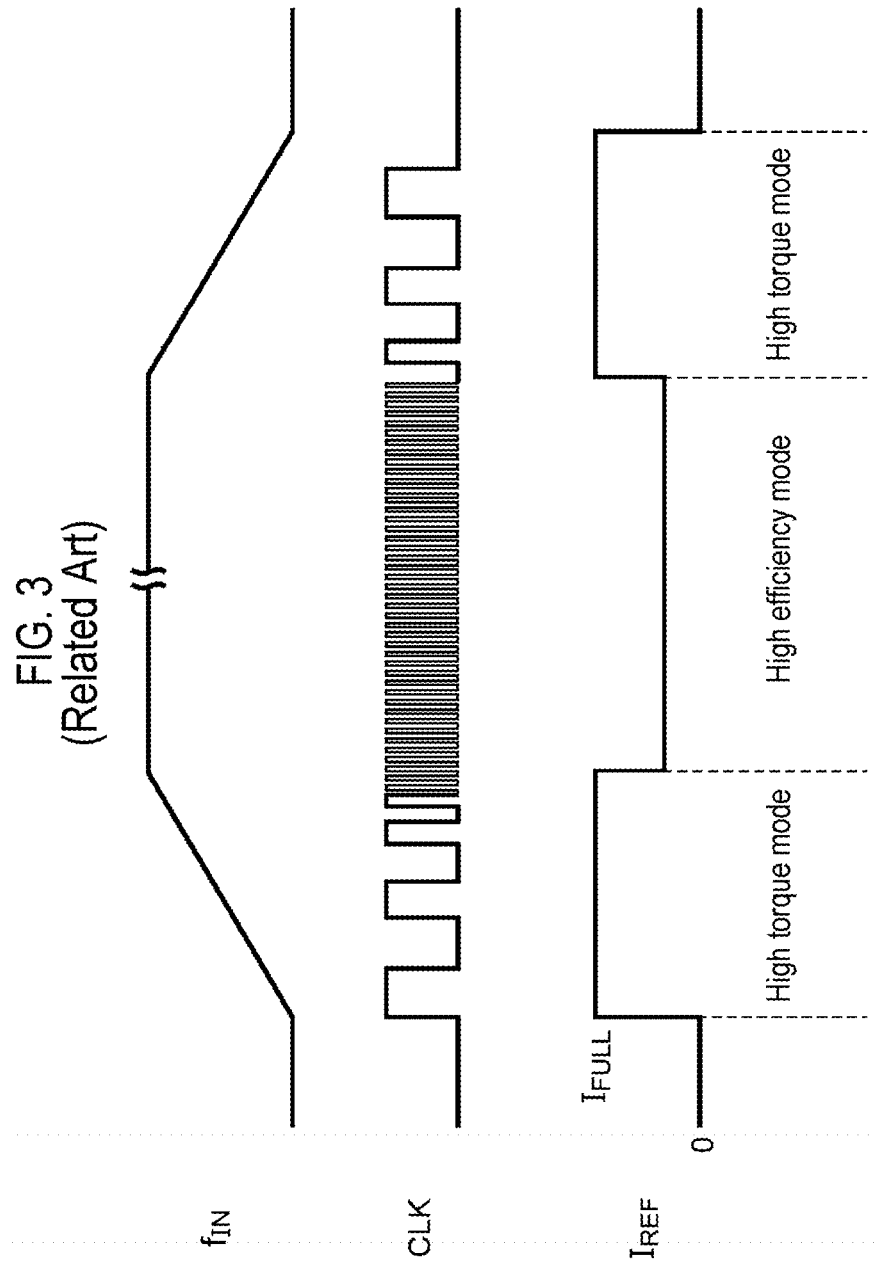
FIG. 3 is a diagram illustrating a driving sequence of the stepping motor.

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

The present disclosure will now be described with reference to the drawings based on an exemplary embodiment. Like or equivalent components, members, and processes illustrated in each drawing are given like reference numerals and a repeated description thereof will be properly omitted. Further, the embodiment is presented by way of example only, and is not intended to limit the present disclosure, and any feature or combination thereof described in the embodiment may not necessarily be essential to the present disclosure.

In the present disclosure, "a state where a member A is connected to a member B" includes a case where the member A and the member B are physically directly connected or even a case where the member A and the member B are indirectly connected via any other member that does not affect an electrical connection state between the members A and B or does not impair functions and effects achieved by combinations of the members A and B.

Similarly, "a state where a member C is installed between a member A and a member B" includes a case where the member A and the member C or the member B and the member C are indirectly connected via any other member that does not affect an electrical connection state between the member A and the member C or the member B and the member C or does not impair function and effects achieved by combinations of the member A and the member C or the member B and the member C, in addition to a case where the member A and the member C or the member B and the member C are directly connected.

The vertical axis and the horizontal axis of the waveform diagram or the time chart referred to herein are appropriately enlarged and reduced for ease of understanding, and each waveform shown is also simplified, exaggerated, or emphasized for ease of understanding.

Embodiment 1

Figure 4:
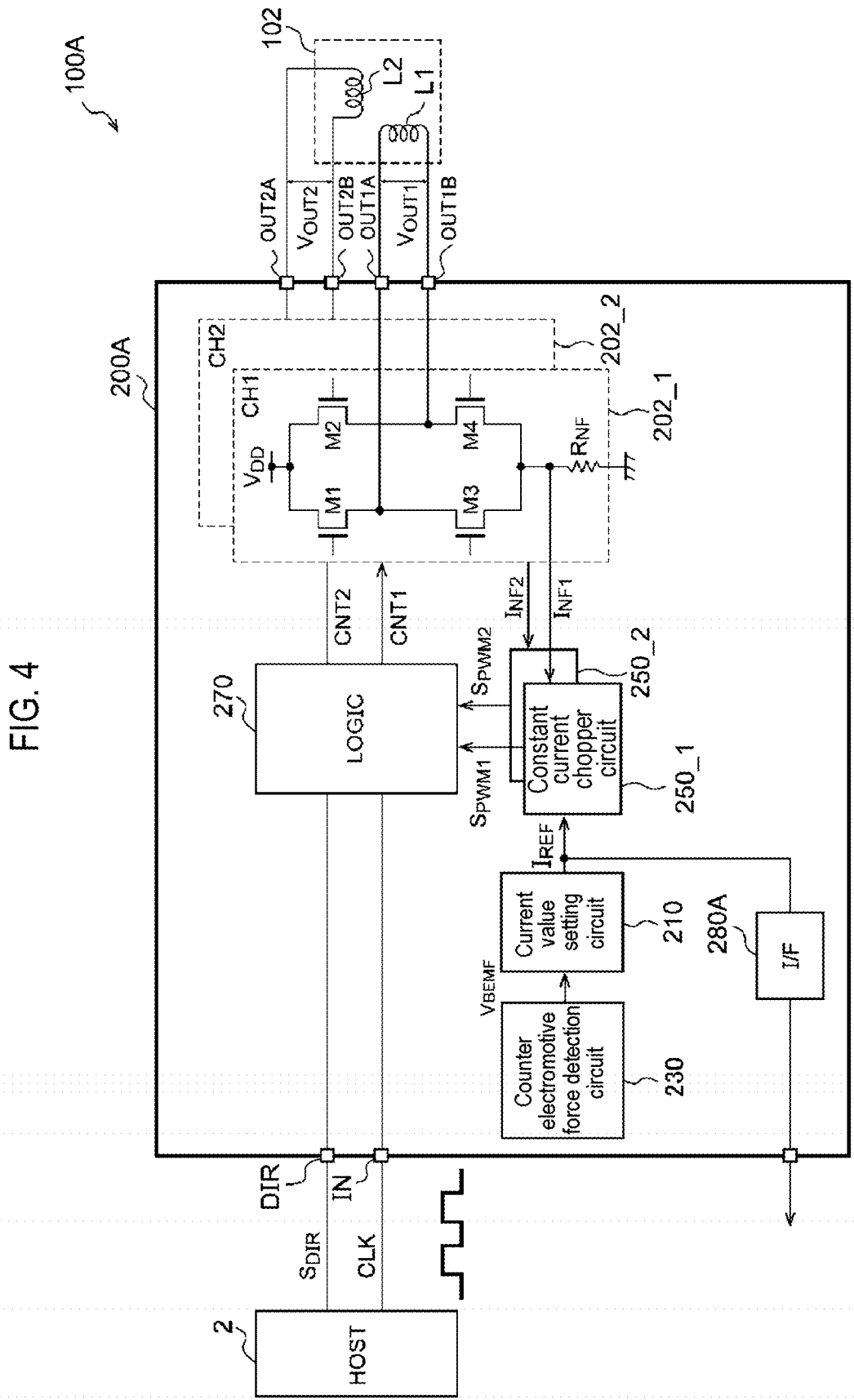
FIG. 4 is a block diagram of a motor system including a driving circuit according to a first embodiment of the present disclosure.

FIG. 4 is a block diagram of a motor system 100A including a driving circuit 200A according to a first embodiment of the present disclosure. The driving circuit 200A constitutes the motor system 100A together with a stepping motor 102 and a host controller 2. The stepping motor 102 may be any of a PM (permanent magnet) type, a VR (variable reluctance) type, and an HB (hybrid) type.

An input clock CLK is input from the host controller 2 to an input pin IN of the driving circuit 200A. In addition, a direction indication signal $S_{DIR}$ indicating clockwise (CW) or counterclockwise (CCW) is input to a direction indication pin DIR of the driving circuit 200A.

The driving circuit 200A rotates a rotor of the stepping motor 102 at a predetermined angle in a direction corresponding to the direction indication signal $S_{DIR}$ whenever the input clock CLK is input.

The driving circuit 200A is integrated as one body on a single semiconductor substrate that includes bridge circuits 202_1 and 202_2, a current value setting circuit 210, a counter electromotive force detection circuit 230, constant current chopper circuits 250_1 and 250_2, a logic circuit 270, and an interface circuit 280A.

In the present embodiment, the stepping motor 102 is a two-phase motor, and includes a first coil L1 and a second coil L2. A driving method of the driving circuit 200A is not particularly limited, and may be any of one-phase excitation, two-phase excitation, one-two-phase excitation, or microstep driving (W1-two-phase driving, 2W1-two-phase driving, or the like).

The bridge circuit 202_1 of a first channel CH1 is connected to the first coil L1. The bridge circuit 202_2 of a second channel CH2 is connected to the second coil L2.

Each of the bridge circuits 202_1 and 202_2 is an H-bridge circuit including four transistors M1 to M4. The transistors M1 to M4 of the bridge circuit 202_1 are switched based on a control signal CNT1 from the logic circuit 270, whereby a voltage $V_{OUT1}$ of the first coil L1 (also referred to as a first coil voltage) is switched.

The bridge circuit 202_2 is configured similarly to the bridge circuit 202_1, and the transistors M1 to M4 thereof are switched based on a control signal CNT2 from the logic circuit 270, whereby a voltage $V_{OUT2}$ of the second coil L2 (also referred to as a second coil voltage) is switched.

The current value setting circuit 210 generates a current set value $I_{REF}$. Immediately after the start of the stepping motor 102, the current set value $I_{REF}$ is fixed to any predetermined value (referred to as a full torque set value) $I_{FULL}$. The predetermined value $I_{FULL}$ may be a maximum value within a range that the current set value $I_{REF}$ can take, and in this case, the stepping motor 102 is driven by full torque. This state will be referred to as a high torque mode.

When the stepping motor 102 starts to rotate stably, in other words, when the risk of step-out is reduced, it is shifted to a high efficiency mode. The current value setting circuit 210 adjusts the current set value $I_{REF}$ by feedback control in the high efficiency mode, thereby reducing power consumption.

The counter electromotive force detection circuit 230 detects a counter electromotive force $V_{BEMF1}$ ($V_{BEMF2}$) generated in the coil L1 (L2) of the stepping motor 102. A method for detecting the counter electromotive force is not particularly limited, and a known technique may be used. In general, the counter electromotive force may be obtained by setting a certain detection window (detection section), setting both ends of the coil to high impedance, and sampling a voltage of the coil at that time. Therefore, the counter electromotive force $V_{BEMF1}$ ($V_{BEMF2}$) can be measured each time one end of the coil to be monitored (output of the bridge circuit) becomes high impedance, i.e., for each predetermined excitation position.

The constant current chopper circuit 250_1 generates a pulse-modulated signal $S_{PWM1}$ which is pulse-modulated so that a detected value $I_{NF1}$ of a coil current $I_{L1}$ flowing through the first coil L1 approaches a target amount based on the current set value $I_{REF}$ while the first coil L1 is supplied with electric power. The constant current chopper circuit 250_2 generates a pulse-modulated signal $S_{PWM2}$ which is pulse-modulated so that a detected value $I_{NF2}$ of a coil current $I_{L2}$ flowing through the second coil L2 approaches the current set value $I_{REF}$ while the second coil L2 is supplied with electric power.

The bridge circuits 202_1 and 202_2 each include a current detection resistor $R_{NF}$, in which a voltage drop of the current detection resistor $R_{NF}$ becomes the detected value of the coil current $I_L$. The position of the current detection resistor $R_{NF}$ is not limited, but it may be installed at a power source side or may be installed in series with the coil between two outputs of the bridge circuit.

The logic circuit 270 controls the bridge circuit 202_1 connected to the first coil L1 depending on the pulse-modulated signal $S_{PWM1}$. Also, the logic circuit 270 controls the bridge circuit 202_2 connected to the second coil L2 depending on the pulse-modulated signal $S_{PWM2}$.

The logic circuit 270 changes the excitation position and switches the coil (or the pair of coils) for supplying a current whenever the input clock CLK is input. The excitation position is recognized as a combination of magnitudes and directions of the coil current of the first coil L1 and the coil current of the second coil L2. The excitation position may be shifted according to only a positive edge or only a negative edge of the input clock CLK, or both.

As described above, the current value setting circuit 210 is configured to be switched between (i) a high torque mode in which the current set value $I_{REF}$ defining the amplitude of the coil current is fixed to a large value corresponding to the full torque and (ii) a high efficiency mode in which the current set value $I_{REF}$ is adjusted by feedback control.

The driving circuit 200A is configured to output the current set value $I_{REF}$ to the outside or to access the current set value $I_{REF}$ from the outside. To this end, the interface circuit 280A is installed in the driving circuit 200A.

The interface circuit 280A may be switched to be enabled or disabled, in which the interface circuit 280A may be enabled only when the current set value $I_{REF}$ is desired to be known.

Figure 5A:
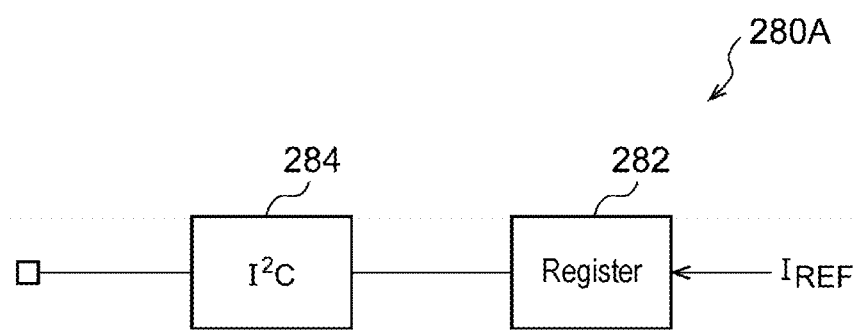
FIGS. 5A to 5C are diagrams illustrating configuration examples of an interface circuit.
Figure 5B:
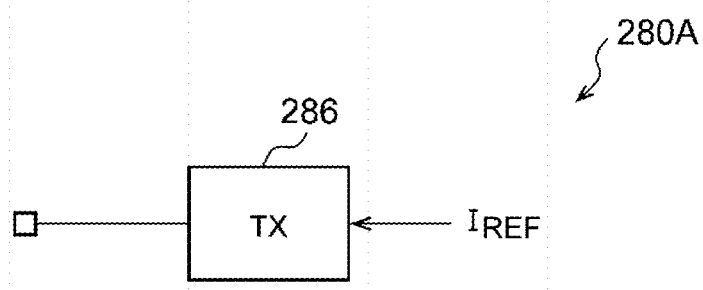
Figure 5C:
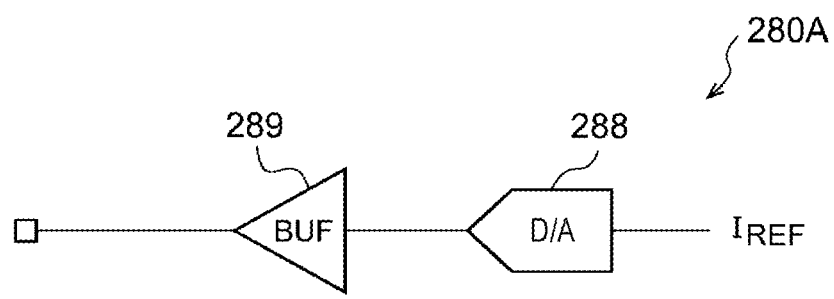

FIGS. 5A to 5C are diagrams illustrating configuration examples of the interface circuit 280A. In FIG. 5A, the interface circuit 280A includes a register 282 and an I²C (inter IC) circuit 284. The current set value $I_{REF}$ at a predetermined timing is written in the register 282. Alternatively, the value of the register 282 may be updated at all times by the current set value $I_{REF}$ changing every moment. The I²C circuit 284 may output the current set value $I_{REF}$ to the outside when the register 282 is accessed from the outside. Instead of the I²C, an SPI (serial peripheral interface) or other transmitters or transceivers may be used.

Alternatively, the interface circuit 280A may always output the current set value $I_{REF}$ to the outside regardless of whether there is a request from the outside. In FIG. 5B, a digital current set value $I_{REF}$ is always output to the outside by a transmitter 286.

In FIG. 5C, a D/A converter 288 converts the digital current set value $I_{REF}$ into an analog signal (voltage signal). Then, a buffer 289 outputs the analog signal to the outside.

Figure 6:
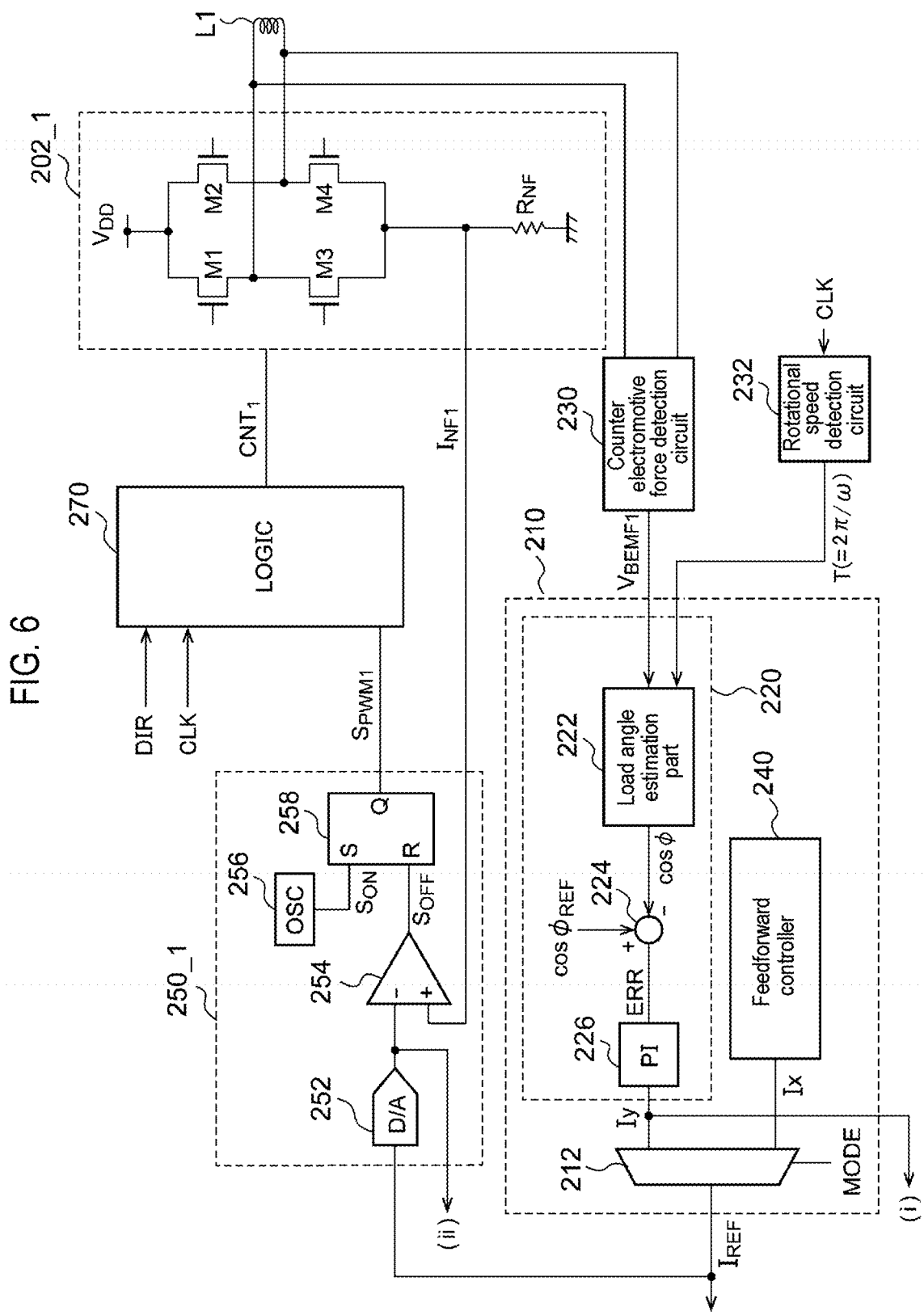
FIG. 6 is a circuit diagram illustrating a configuration example of the driving circuit.

FIG. 6 is a circuit diagram illustrating a configuration example of the driving circuit 200A. Only a portion related to the first coil L1 is illustrated in FIG. 6.

The current value setting circuit 210 will be described. The current value setting circuit 210 includes a feedback controller 220, a feedforward controller 240, and a multiplexer 212. The feedforward controller 240 outputs a fixed current set value Ix (=$I_{FULL}$) used in the high torque mode immediately after the starting. This current set value Ix is set to a large value in order to prevent step-out.

The feedback controller 220 becomes active in the high efficiency mode, and outputs a current set value Iy which is feedback-controlled based on the counter electromotive force $V_{BEMF}$.

The multiplexer 212 selects one of the two signals Ix and Iy depending on a mode selection signal MODE to output the selected signal as the current set value $I_{REF}$.

The feedback controller 220 includes a load angle estimation part 222, a subtractor 224, and a proportional-integral (PI) controller 226.

The counter electromotive force detection circuit 230 detects a counter electromotive force $V_{BEMF1}$ ($V_{BEMF2}$) generated in the coil L1 (L2) of the stepping motor 102. A method for detecting the counter electromotive force is not particularly limited, and a known technique may be used. In general, the counter electromotive force can be obtained by setting a certain detection window (detection section), setting both ends of the coil to high impedance, and sampling the voltage of the coil at that time. Therefore, the counter electromotive force $V_{BEMF1}$ ($V_{BEMF2}$) can be measured each time one end of the coil to be monitored (output of the bridge circuit) becomes high impedance, i.e., for each predetermined excitation position.

The load angle estimation part 222 estimates a load angle φ based on the counter electromotive force $V_{BEMF1}$. The load angle φ corresponds to a difference between a current vector (i.e., a position command) determined by a driving current flowing through the first coil L1 and a position of a rotor (movable element). As described above, the counter electromotive force $V_{BEMF1}$ is given by the following equation.

$$V_{BEMF1} = K_E \cdot \omega \cdot \cos\varphi$$

wherein $K_E$ is a counter electromotive force constant and ω is a rotation speed. Therefore, a detected value having a correlation with the load angle φ can be generated by measuring the counter electromotive force $V_{BEMF}$. For example, cow may be used as the detected value. In this case, the detected value is expressed by Eq. (2).

$$\cos\varphi = V_{BEMF1} \cdot \omega^{-1} / K_E \qquad \text{Eq. (2)}$$
$$= V_{BEMF1} \cdot (T/2\pi) \cdot K_E^{-1}$$

The feedback controller 220 generates the current set value Iy so that the estimated load angle φ approaches a predetermined target angle $\varphi_{REF}$. Specifically, the subtractor 224 generates an error ERR between the detected value cow and the target value $\cos(\varphi_{REF})$ based on the load angle φ. The PI controller 226 performs a PI control operation so that the error ERR becomes zero to generate the current set value Iy. The processing of the feedback controller 220 may also be realized by an analog circuit using an error amplifier.

The constant current chopper circuit 250_1 includes a D/A converter 252, a PWM comparator 254, an oscillator 256, and a flip-flop 258. The D/A converter 252 converts the current set value $I_{REF}$ into an analog voltage $V_{REF}$. The PWM comparator 254 compares the feedback signal $I_{NF1}$ with the reference voltage $V_{REF}$, and asserts (high) an OFF signal $S_{OFF}$ when $I_{NF1} > V_{REF}$. The oscillator 256 generates a periodic ON signal $S_{ON}$ defining a chopping frequency. The flip-flop 258 outputs a PWM signal $S_{PWM1}$ which transitions to an ON level (for example, high) in response to the ON signal $S_{ON}$ and transitions to an OFF level (for example, low) in response to the OFF signal $S_{OFF}$.

Although the interface circuit 280A is omitted in FIG. 6, it may be installed at a position corresponding to the configuration of the interface circuit 280A. When the interface circuit 280A in FIG. 5A is employed, the output Iy of the feedback controller 220 may be stored in the register 282. When the interface circuit 280A in FIG. 5B is employed, the output Iy of the feedback controller 220 may be output to the outside by the transmitter 286. These paths are illustrated as (i) in FIG. 6.

When the interface circuit 280A in FIG. 5C is employed, the D/A converter 288 may be configured to correspond to the D/A converter 252, and the output of the D/A converter 252 may be output to the outside by the buffer 289. This path is illustrated as (ii) in FIG. 6.

The configuration of the driving circuit 200A has been described above. Next, an operation thereof will be described.

(i) The interface circuit 280A can be effectively utilized in the design stage of the motor system 100. In the design stage, the load and rotational speed of the stepping motor 102 are determined for each platform and application. When they are determined, the amount of current in the high efficiency mode becomes a substantially constant value. Therefore, in the design stage, when the current set value $I_{REF}$ stabilized to a certain amount in the high efficiency mode is obtained, it is possible to know how much torque allows the stepping motor to be driven, which can be useful for system design.

(ii) The interface circuit 280A can be effectively utilized even during the actual operation of the motor system 100. For example, the current set value $I_{REF}$ stabilized in the high efficiency mode is monitored, and when it is out of an appropriate range, it can be determined that an error has occurred.

Embodiment 2

Figure 7:
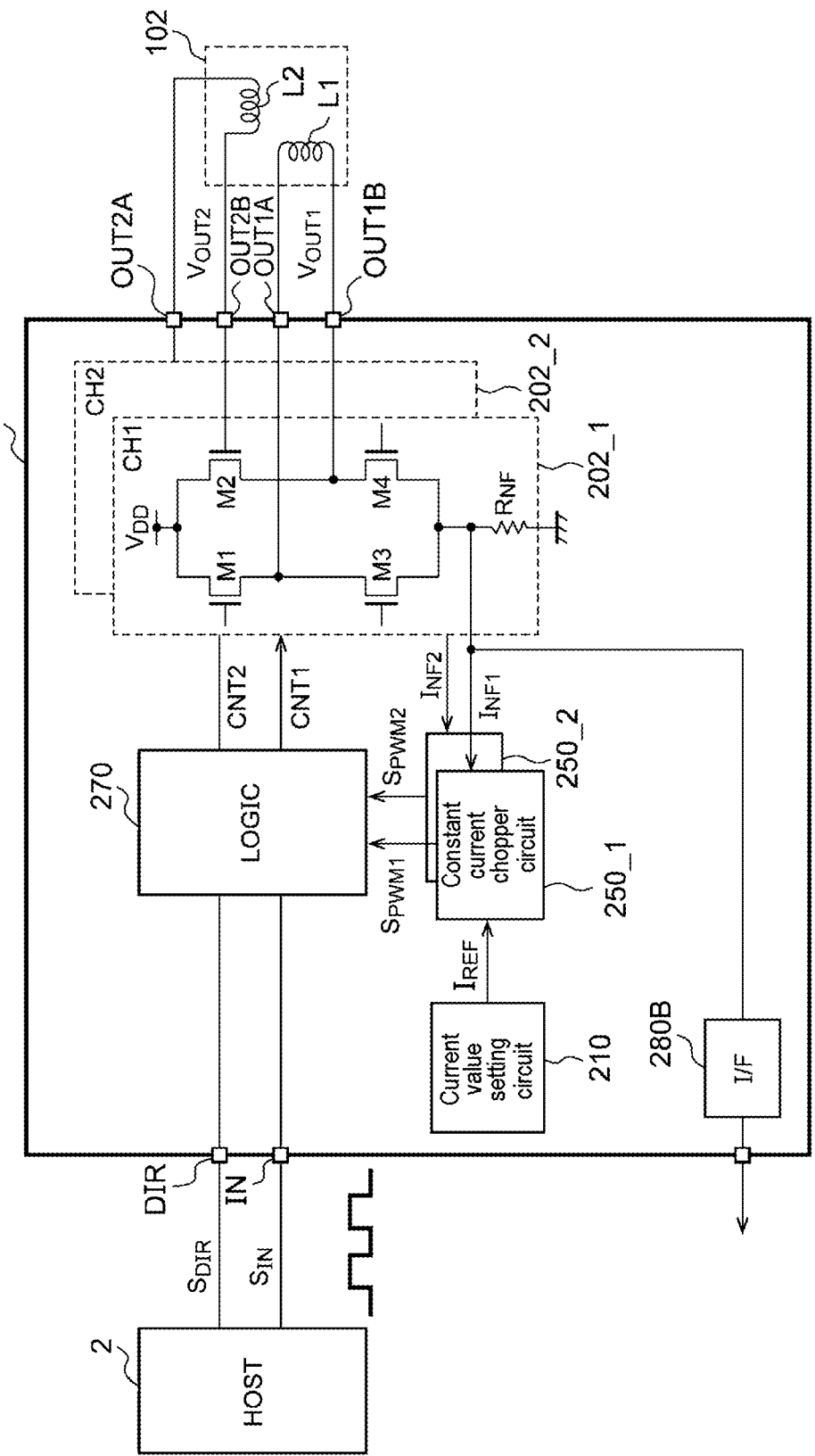
FIG. 7 is a block diagram of a motor system including a driving circuit according to a second embodiment of the present disclosure.

FIG. 7 is a block diagram of a motor system 100B including a driving circuit 200B according to a second embodiment of the present disclosure. A basic configuration of the motor system 100B is identical to that of the motor system 100A in FIG. 4, and therefore, only differences will be described.

The driving circuit 200B is configured to output the detected value of the coil current $I_L$ to the outside, or to access the detected value of the coil current from the outside. The driving circuit 200B includes an interface circuit 280B instead of the interface circuit 280A in FIG. 4. The interface circuit 280B is installed to output the detected value of the coil current to the outside as an analog signal or a digital signal, or the interface circuit 280B is installed to access the detected value of the coil current from the outside.

The detected value $I_{NF1}$ (or $I_{NF2}$) of the coil current corresponds to a voltage drop of the detection resistor $R_{NF}$ installed in the bridge circuit 202_1 (or 202_2).

Figure 8A:
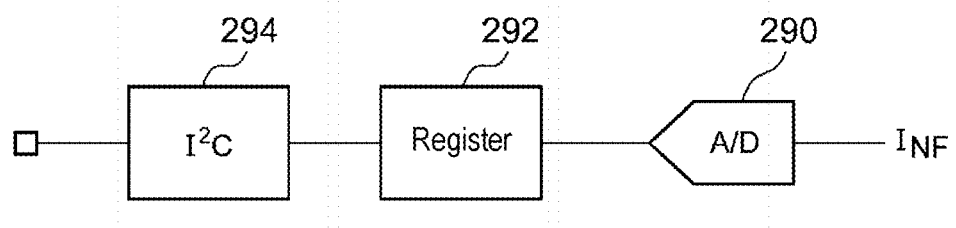
FIGS. 8A to 8C are diagrams illustrating configuration examples of an interface circuit.
Figure 8B:
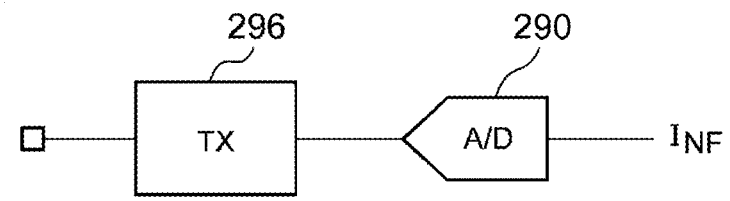
Figure 8C:
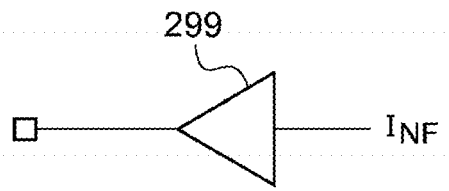

FIGS. 8A to 8C are diagrams illustrating configuration examples of the interface circuit 280B. In FIG. 8A, the interface circuit 280B includes an A/D converter 290, a register 292, and an I²C circuit 294. The A/D converter 290 samples a current-detected value $I_{FB}$ at a predetermined timing and converts it into a digital signal. The digital signal of the current-detected value is written in the register 292. The value of the register 292 may be updated at all times at each sampling timing. The I²C circuit 294 may output a digital current-detected value $I_{NF}$ to the outside when the register 292 is accessed from the outside. Instead of the I²C, an SPI (serial peripheral interface) or other transmitters or transceivers may be used.

Alternatively, the interface circuit 280B may always output the current-detected value $I_{NF}$ to the outside regardless of whether there is a request from the outside. In FIG. 8B, the digital current-detected value $I_{NF}$ is always output to the outside by the transmitter 296.

In FIG. 8C, a buffer 299 outputs an analog current-detected value $I_{NF}$ to the outside.

More specifically, the driving circuit 200B in FIG. 7 may be configured similarly to the driving circuit 200A in FIG. 6, in which the interface circuit 280B may be added at an appropriate position.

The configuration of the driving circuit 200B has been described above. Next, an operation thereof will be described.

(i) The interface circuit 280B can be effectively utilized in the design stage of the motor system 100. Since the constant current chopping control is performed so that the current-detected value $I_{NF}$ coincides with the current set value $I_{REF}$, it may be considered that the current-detected value $I_{NF}$ and the current set value $I_{REF}$ are substantially equal in a steady state.

In the design stage, in a situation where the stepping motor is stably driven in the high-efficiency mode, when the current-detected value $I_{NF}$ stabilized to a certain amount is obtained, it is possible to know how much torque allows the stepping motor to be driven, which can be useful for system design.

(ii) The interface circuit 280B can be effectively utilized even during the actual operation of the motor system 100. For example, the current-detected value $I_{NF}$ stabilized in the high efficiency mode is monitored, and when it is out of a proper range, it can be determined that an error has occurred.

Figure 9:
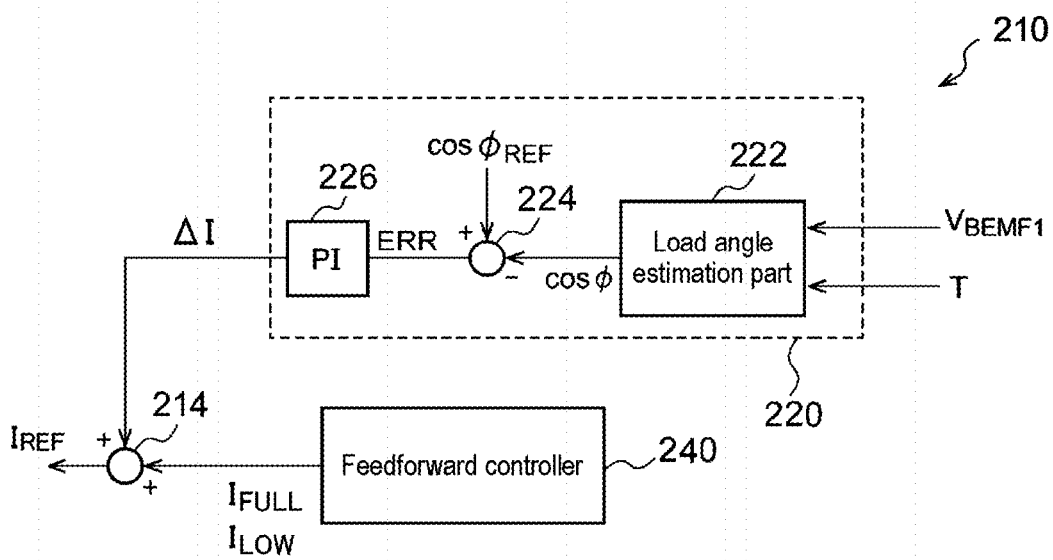
FIG. 9 is a diagram illustrating another configuration example of a current value setting circuit.

FIG. 9 is a diagram illustrating another configuration example of the current value setting circuit 210. The feedback controller 220 is active in the high efficiency mode, and generates a current-corrected value ΔI whose value is adjusted so that the load angle φ approaches the target value $φ_{REF}$. The current-corrected value ΔI is zero in the high torque mode.

The feedforward controller 240 outputs a predetermined high efficiency set value $I_{LOW}$ in the high efficiency mode. A relationship of $I_{FULL} > I_{LOW}$ may be established. The current value setting circuit 210 includes an adder 214 instead of the multiplexer 212 in FIG. 6, in which the adder 214 adds the current-corrected value ΔI to the high efficiency set value $I_{LOW}$ generated by the feedforward controller 240. Thus, the current set value $I_{REF} = I_{LOW} + ΔI$ is adjusted so that the load angle φ approaches the target value $φ_{REF}$.

Figure 10A:
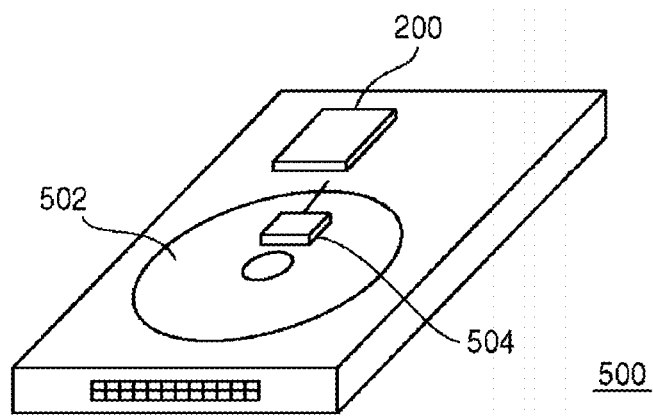
FIGS. 10A to 10C are perspective views illustrating examples of an electronic device including the driving circuit.
Figure 10B:
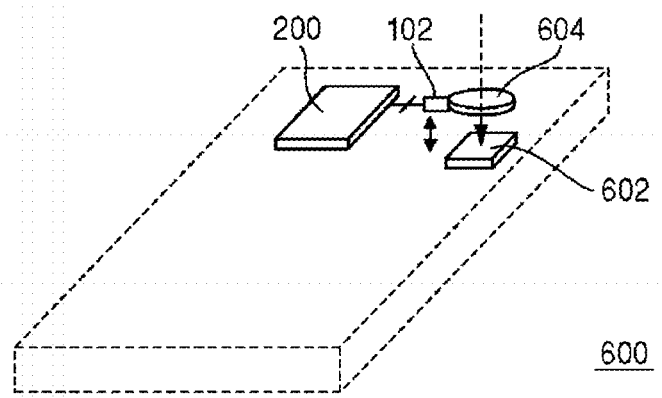
Figure 10C:
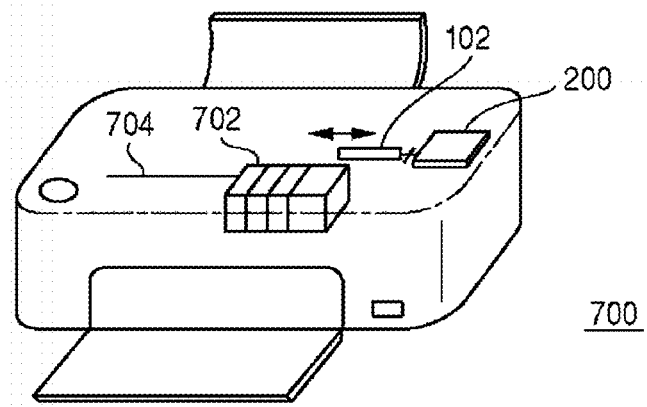

Lastly, applications of the driving circuits 200A and 200B (generally and simply referred to as a driving circuit 200) will be described. The driving circuit 200 is used for various electronic devices. FIGS. 10A to 10C are perspective views illustrating examples of an electronic device including the driving circuit 200.

The electronic device in FIG. 10A is an optical disk device 500. The optical disk device 500 includes an optical disk 502 and a pickup 504. The pickup 504 is installed for writing and reading data into and from the optical disc 502. The pickup 504 is movable over the recording surface of the optical disk 502 in the radial direction of the optical disk (tracking). The distance between the pickup 504 and the optical disk is also variable (focusing). The pickup 504 is positioned by a stepping motor (not shown). The driving circuit 200 controls the stepping motor. With this configuration, the pickup 504 can be positioned with high efficiency and high accuracy while preventing step-out.

The electronic device in FIG. 10B is a device 600 having an imaging function, such as a digital still camera, a digital video camera, a portable telephone terminal, or the like. The device 600 includes an imaging element 602 and an auto-focus lens 604. The stepping motor 102 positions the auto-focus lens 604. According to this configuration in which the driving circuit 200 drives the stepping motor 102, the auto-focus lens 604 can be positioned with high efficiency and high accuracy while preventing step-out. The driving circuit 200 may be used for driving a lens for camera shake correction, in addition to the auto-focus lens. Alternatively, the driving circuit 200 may be used for aperture control.

The electronic device in FIG. 10C is a printer 700. The printer 700 includes a head 702 and a guide rail 704. The head 702 is supported so as to be positioned along the guide rail 704. The stepping motor 102 controls the position of the head 702. The driving circuit 200 controls the stepping motor 102. With this configuration, the head 702 can be positioned with high efficiency and high accuracy while preventing step-out. The driving circuit 200 may be used for driving a motor for a paper feeding mechanism, in addition to driving the head.

The present disclosure has been described above with reference to the embodiments. It is to be understood by those of ordinary skill in the art that the embodiments are merely illustrative and may be differently modified by any combination of the components or processes, and the modifications are also within the scope of the present disclosure. Hereinafter, the modifications will be described.

(Modification 1)

The logic circuit 270 may adjust a power source voltage $V_{DD}$ supplied to the bridge circuit 202, instead of adjusting the duty ratio of the pulse-modulated signal S2 or in combination with it, so that the load angle φ approaches the target angle $φ_{REF}$. By changing the power source voltage $V_{DD}$, the electric power supplied to the coils L1 and L2 of the stepping motor 102 can be changed.

(Modification 2)

In the embodiments, there has been described a case where the bridge circuit 202 is configured by a full bridge circuit (H bridge). However, the present disclosure is not limited thereto, and the bridge circuit 202 may be configured by a half bridge circuit. Also, the bridge circuit 202 may be a separate chip from the driving circuit 200A (200B) or may be a discrete component.

(Modification 3)

The method for generating the current set value Iy in the high efficiency mode is not limited to that described in the embodiments. For example, a target value $V_{BEMF(REF)}$ of the counter electromotive force $V_{BEMF1}$ may be determined, and a feedback loop may be configured so that the counter electromotive force $V_{BEMF1}$ approaches the target value $V_{BEMF(REF)}$.

(Modification 4)

In the embodiments, the currents $I_{OUT1}$ and $I_{OUT2}$ flowing through the two coils are turned on and off according to an excitation position, but the amount of currents thereof is constant regardless of the excitation position. In this case, the torque is varied in the case of one-two-phase excitation. Instead of this control, the currents $I_{OUT1}$ and $I_{OUT2}$ may be corrected so that the torque is constant regardless of the excitation position. For example, in the one-two-phase excitation, the amounts of the currents $I_{OUT1}$ and $I_{OUT2}$ at the excitation positions 2, 4, 6, and 8 may be set to $\sqrt{2}$ times the amounts of the currents at the excitation positions 1, 3, 5, and 7.

(Modification 5)

In the embodiments, the feedback controller 220 is configured by the PI controller. However, the present disclosure is not limited thereto, and a PID controller or the like may be used.

According to the present disclosure in some embodiments, it is possible to output information useful for system design or control to outside.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A driving circuit for a stepping motor, comprising:
  a counter electromotive force detection circuit configured to detect a counter electromotive force generated in a coil;
  a current value setting circuit configured to generate a current set value based on the counter electromotive force;
  a constant current chopper circuit configured to generate a pulse-modulated signal which is pulse-modulated so that a detected value of a coil current flowing through the coil approaches a target amount based on the current set value; and
  a logic circuit configured to control a bridge circuit connected to the coil according to the pulse-modulated signal,
  wherein the driving circuit is configured to output the current set value to outside or to access the current set value from the outside, and
  wherein the constant current chopper circuit includes:
    a comparator configured to compare the detected value of the coil current with a threshold value based on the current set value;
    an oscillator configured to oscillate at a predetermined frequency; and
    a flip-flop configured to output the pulse-modulated signal which transitions to an OFF level in response to an output of the comparator and transitions to an ON level in response to an output of the oscillator.

2. The circuit of claim 1, further comprising:
  an interface circuit configured to output the current set value to the outside as a digital signal.

3. The circuit of claim 1, further comprising:
  a D/A converter configured to convert the current set value into an analog signal; and
  a buffer circuit configured to output the current set value, which has been converted into the analog signal, to the outside.

4. The circuit of claim 1, wherein the current value setting circuit includes:
  a load angle estimation part configured to estimate a load angle based on the counter electromotive force; and
  a feedback controller configured to generate the current set value so that the estimated load angle approaches a predetermined target angle.

5. The circuit of claim 1, wherein the driving circuit is integrated as one body on a single semiconductor substrate.

6. An electronic device, comprising:
  a stepping motor; and
  the driving circuit of claim 1 configured to drive the stepping motor.

7. A driving circuit for a stepping motor, comprising:
  a counter electromotive force detection circuit configured to detect a counter electromotive force generated in a coil;
  a current value setting circuit configured to generate a current set value based on the counter electromotive force;
  a constant current chopper circuit configured to generate a pulse-modulated signal which is pulse-modulated so that a detected value of a coil current flowing through the coil approaches a target amount based on the current set value; and
  a logic circuit configured to control a bridge circuit connected to the coil according to the pulse-modulated signal,
  wherein the driving circuit is configured to output the detected value of the coil current to outside or to access the detected value of the coil current from the outside, and
  wherein the constant current chopper circuit includes:
    a comparator configured to compare the detected value of the coil current with a threshold value based on the current set value;
    an oscillator configured to oscillate at a predetermined frequency; and
    a flip-flop configured to output the pulse-modulated signal which transitions to an OFF level in response to an output of the comparator and transitions to an ON level in response to an output of the oscillator.

8. The circuit of claim 7, wherein the detected value of the coil current is according to a voltage drop of a detection resistor installed at the bridge circuit, and
  wherein the driving circuit further includes a buffer configured to output the voltage drop of the detection resistor to the outside.

9. The circuit of claim 7, wherein the detected value of the coil current is according to a voltage drop of a detection resistor installed at the bridge circuit, and
  wherein the driving circuit further includes:
    an A/D converter configured to convert the voltage drop of the detection resistor into a digital value; and
    an interface circuit configured to output the digital value to the outside.

10. A method of driving a stepping motor, comprising:
  detecting a counter electromotive force generated in a coil;
  generating a current set value based on the counter electromotive force;

generating a pulse-modulated signal which is pulse-modulated so that a detected value of a coil current flowing through the coil approaches a target amount based on the current set value;

controlling a bridge circuit connected to the coil of the stepping motor according to the pulse-modulated signal; and supplying the current set value to a host controller, wherein the generating the pulse-modulated signal includes:

comparing, by a comparator, the detected value of the coil current with a threshold value based on the current set value; and outputting, by a flip-flop, the pulse-modulated signal which transitions to an OFF level in response to an output of the comparator and transitions to an ON level in response to an output of an oscillator that is configured to oscillate at a predetermined frequency.

11. A method of driving a stepping motor, comprising:

detecting a counter electromotive force generated in a coil;

generating a current set value based on the counter electromotive force;

generating a pulse-modulated signal which is pulse-modulated so that a detected value of a coil current flowing through the coil approaches a target amount based on the current set value;

controlling a bridge circuit connected to the coil of the stepping motor according to the pulse-modulated signal; and supplying the detected value of the coil current to a host controller, wherein the generating the pulse-modulated signal includes:

comparing, by a comparator, the detected value of the coil current with a threshold value based on the current set value; and outputting, by a flip-flop, the pulse-modulated signal which transitions to an OFF level in response to an output of the comparator and transitions to an ON level in response to an output of an oscillator that is configured to oscillate at a predetermined frequency.

\* \* \* \* \*